Sept. 12, 1933.  L. A. WILSON ET AL  1,926,607
METHOD AND APPARATUS FOR PRODUCING SOUND FROM PHOTOGRAPHIC SOUND RECORDS
Filed June 19, 1931  2 Sheets-Sheet 1
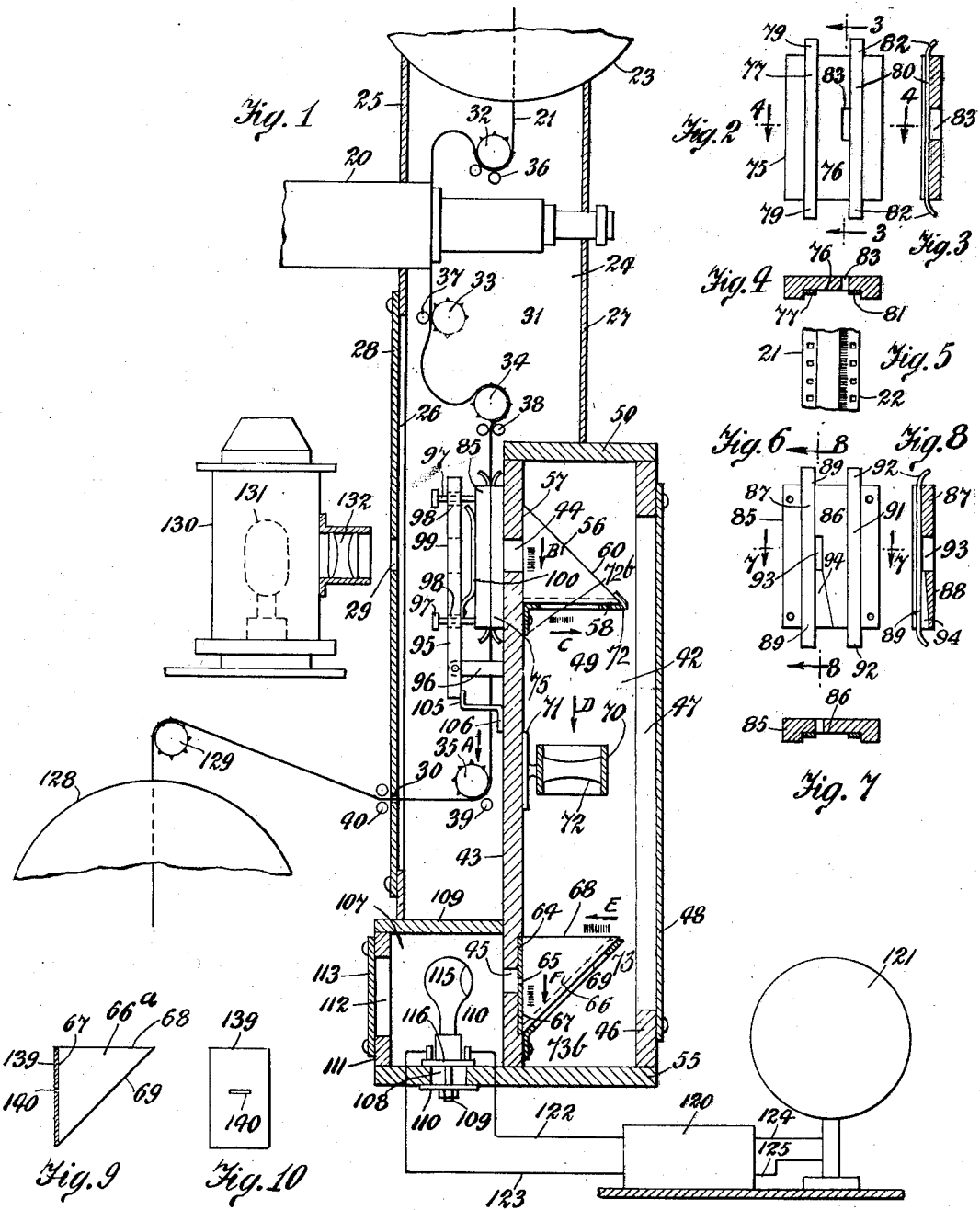
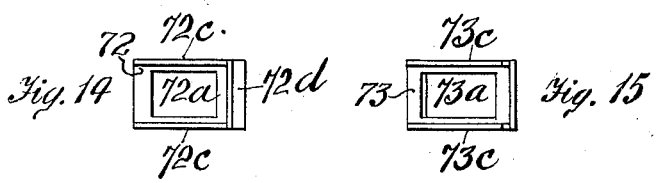
INVENTORS
Lyman A. Wilson
AND
Joseph Johnson
BY
A. A. de Bonneville
ATTORNEY Sept. 12, 1933.   L. A. WILSON ET AL   1,926,607
METHOD AND APPARATUS FOR PRODUCING SOUND FROM PHOTOGRAPHIC SOUND RECORDS
Filed June 19, 1931   2 Sheets-Sheet 2
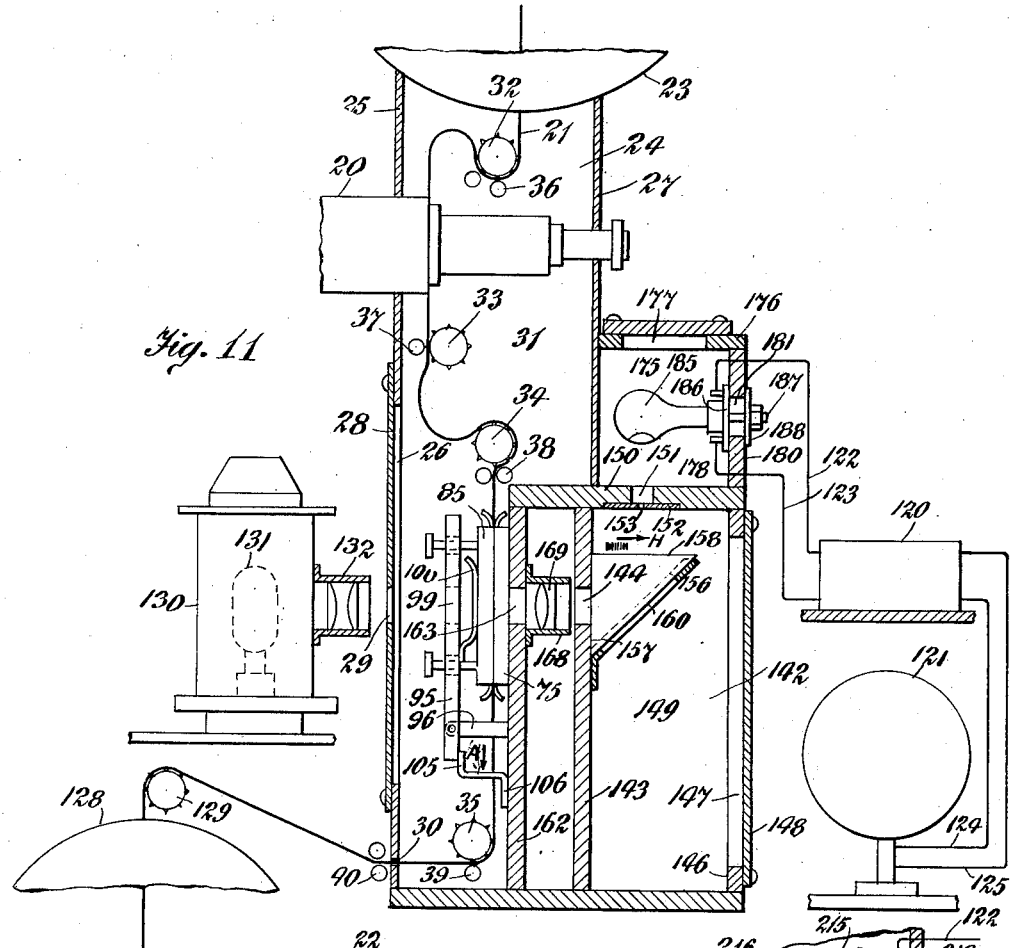
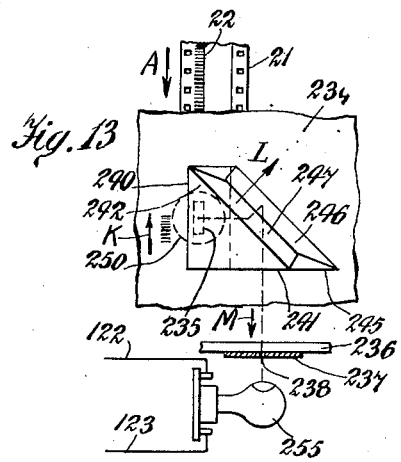
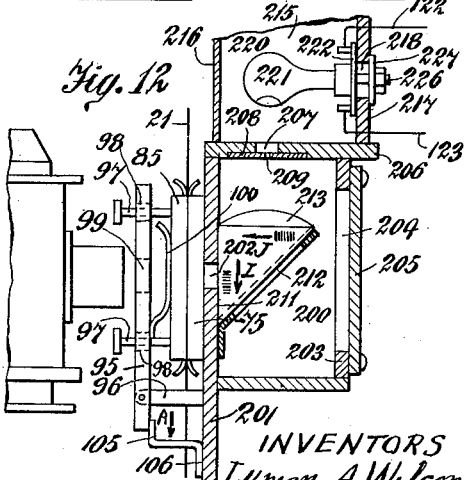
INVENTORS
Lyman A. Wilson
AND
Joseph Johnson
By N.A. de Bonneville
ATTORNEY Patented Sept. 12, 1933

1,926,607

UNITED STATES PATENT OFFICE 1,926,607

METHOD AND APPARATUS FOR PRODUCING SOUND FROM PHOTOGRAPHIC SOUND RECORDS

Lyman A. Wilson and Joseph Johnson, New York, N. Y.

Application June 19, 1931. Serial No. 545,446

11 Claims. (Cl. 179—100.3)

This invention relates to the method and the apparatus for producing sound from a photographic sound record.

The object of the invention is the production of means, to present to a photoelectric cell the light sound markings of a motion picture film, the said light sound markings being either of uniform width with varying density, or of constant density and varying width.

The second object of the invention is the elimination of extraneous noises and faults resulting from foreign matter, such as dirt, fuzz, film emulsion and the like gathering on the film guide plates of the apparatus, and obscuring the opening therethrough.

The third object of the invention is the production of means, whereby the light sound record of a 16 millimeter motion picture film is made practically available for the reproduction of sound, presenting the markings of the light sound record in the same sequence to a photoelectric cell as presented to the aperture in the film guide plates of the apparatus.

The fourth object of the invention is the production of means, whereby a magnified image of the light sound record of a 16 millimeter film is presented to an adjustably positioned photoelectric cell, to energize the latter with the greatest efficiency.

In the accompanying drawings, Fig. 1 represents a side elevation partly in section of an exemplification of the apparatus of the invention with a fragmentary portion of a motion picture projecting machine; Fig. 2 shows an inside elevation of one of a pair of film guide plates of Fig. 1; Fig. 3 is a section of Fig. 2 on the line 3, 3; Fig. 4 indicates a section of Fig. 2 on the line 4, 4; Fig. 5 shows a plan view of a fragmentary portion of 16 millimeter film, with the light sound record adjacent to one side thereof; Fig. 6 shows an inside elevation of the accompanying film guide plate; Fig. 7 represents a section of Fig. 6 on the line 7, 7; Fig. 8 shows a section of Fig. 6 on the line 8, 8; Fig. 9 shows a side view of a modified prism used in the apparatus; Fig. 10 is a left hand view of Fig. 9; Fig. 11 shows a side elevation of the apparatus similar to Fig. 1 with a modification; Fig. 12 represents a fragmentary side elevation similar to Fig. 11 with a third modification; Fig. 13 shows a fragmentary view of the apparatus with a fourth modification; Figs. 14 and 15 indicate plan views of brackets.

Referring to Figs. 1 to 8 a fragmentary portion of a motion picture projecting machine is indicated at 20. The film 21 is indicated with its light sound record at 22. The upper magazine for the film 21, is shown at 23. The light sound record 22 of the film is in synchronized position with the pictures on said film. A film chamber is shown at 24 and has extending therethrough the front end of the projecting machine. The said chamber 24 comprises the front wall 25 having the opening 26 and the rear wall 27. A cover 28 having the aperture 29 and the slit 30, is detachably connected to the wall 25 over the opening 26. Side walls 31, one of which is shown, are provided for the chamber 24.

In the film chamber 24 are journaled in this instance the sprocket wheels 32, 33, 34, and 35, and the guide rollers 36, 37, 38 and 39.

A pair of guide rollers 40 are journaled to the cover 28 and coact with the slit 30.

A light chamber indicated at 42 is positioned below the wall 27 and comprises the front wall 43, having the openings 44 and 45, and the rear wall 46 having the opening 47. A cover 48 is detachably connected to the wall 46 over the opening 47. The chamber 42 has side walls 49, one of which is shown. The top wall of the chamber 42 is shown at 50 and its bottom wall is indicated at 55. An upper right angled prism 56 having the vertical face 57, the bottom horizontal face 58 and the hypothenuse 60, is fastened to the inner face of the wall 43 opposite the opening 44. A plate 64 having the microscopic slit 65 is fastened to the inner face of the wall 43 opposite the opening 45. A second and lower right angled prism 66 having the vertical face 67, the upper horizontal face 68 and the hypothenuse 69 is fastened to the plate 64. A lens casing 70 is indicated with the foot 71, which is fastened to the inner face of the wall 43 and supports the magnifying lens 72. The prisms 56 and 66 are clamped in place respectively by means of the brackets 72 and 73.

The bracket 72 comprises a bottom wall having the opening 72a, and the flanges 72b, 72c, and 72d. The bracket 73 comprises a bottom wall having the opening 73a, and the flanges 73b and 73c.

In the chamber 24 and opposite the wall 43 are positioned the film guide plates of the apparatus. The said film guide plates comprise a pair of practically similar plates 75 and 85.

The plate 75 is fastened to the wall 43 and has formed in its inner face the longitudinal recess 76. A guide strip 77 having the curved ends 79 is fastened to the block 75 at one side of the recess 76. A second guide strip 80 having the curved ends 82 is fastened to the block 75 at the other side of its recess 76. An opening 83 extends through the plate 75 adjacent to the strip 80.

The plate 85 is positioned opposite the plate 75 and has formed therein the longitudinal recess 86. A guide strip 87 having the curved ends 89 is fastened to the plate 85 at one side of its recess 86. A second guide strip 91 having the curved ends 92 is fastened to the plate 85 at the other side of its recess 86. An opening 93 extends through the plate 85 adjacent to the strip 87. A scavenging passage 94 is formed in the face of the recess 86 and extends downwardly from the opening 93.

A supporting plate 95 is positioned opposite the plate 85 and is hinged to a pair of supporting bars 96, one of which is shown, that extend from the wall 43. Guide pins 97 having heads extend from the plate 75 and pass through openings 98 in the supporting plate 95. An opening 99 is formed in the supporting plate 95. A pair of springs 100, one of which is shown, have each one end fastened to the plate 95 and their other ends bear against the plate 85. A Z shaped latch spring is shown with the parallel ends 105 and 106. The end 106 is fastened to the wall 43 and the end 105 bears against the inner face of the plate 95.

A third chamber 107 is positioned below the chamber 24, and comprises a lower wall which is an extension of the wall 55, and has the elongated opening 108. The latter chamber is also provided with the top wall 109, side walls 110, one of which is shown, and the front wall 111 having the opening 112 with the detachable cover 113. A photoelectric cell 115 is indicated with the foot 116 which bears on the bottom wall of the chamber 107 over the opening 108. A bolt 109 with a nut as shown extends from the foot 106, and a washer 110 bears between said nut and the bottom wall of said chamber 107.

An amplifier is indicated in its entirety by the numeral 120 and a loud speaker is shown at 121. Wires 122 and 123 for electric current connect the photoelectric cell 115 and the amplifier 120, and wires 124 and 125 connect the amplifier 120 and the loud speaker 121.

The take up magazine for the film 21 is indicated at 128 and a sprocket wheel is shown at 129 above the magazine 128.

A lantern 130 is indicated with the electric light bulb 131, and the sleeve 132 for its condenser lens. The axial opening of the sleeve 132 is coaxial with the openings 44, 83 and 93.

Referring to Figs. 9 and 10, the prism 66$^a$ similar to 66 is indicated with the vertical face 67, the horizontal face 68 and the hypothenuse 69. The face 67 is coacted with a mirror facing 139 having the microscopic slit 140. The prism 66$^a$ can be substituted for the prism 66 and the plate 64.

Referring to Fig. 11, the motion picture projecting machine is again indicated at 20, with the picture film 21, having the light sound record 22 not shown. The upper and lower magazines are again indicated at 23 and 128.

A film chamber is again shown at 24. The chamber 24 is again indicated with the front wall 25 having the opening 26, and the rear wall 27. A cover 28 having the aperture 29 and the slit 30 is again detachably connected to the wall 25. Side walls are provided for the chamber 24 with one shown at 31. Sprocket wheels are again indicated at 32, 33, 34 and 35, and guide rollers are again shown at 36, 37, 38, 39 and 40. A light chamber is indicated at 142, similar to 42 and comprises the front wall 143 having the opening 144, the rear wall 146 having the opening 147. A cover 148 is detachably connected to the wall 146 over the opening 147. The chamber 142 has side walls 149, one of which is shown. The top wall of the chamber 142 is shown at 150, with the opening 151. A plate 152 having the microscopic slit 153 is fastened to the lower face of the top wall 150.

A right angled prism 156 having the vertical face 157, the top horizontal face 158, and the hypothenuse 160 is positioned with its face 157 secured to the inner face of the wall 143. A second wall is shown at 162 having the opening 163. A lens casing 168 with the magnifying lens 169 extends from the inner face of the wall 162 over the opening 163. The film guide plates are again shown at 75 and 85, with the plate 75 fastened to the wall 162. The supporting plate is again shown at 95, with its supporting bars 96, one of which is shown. The opening through the plate 95 is again shown at 99. The springs 100 are again shown with one end of each fastened to the plate 95. The Z shaped latch spring is again shown with the parallel ends 105 and 106.

A third chamber is indicated at 175 above the wall 150. The latter chamber is shown with the top wall 176 having the opening 177. Side walls 178, one of which is shown are provided for the chamber 175. A rear wall for the chamber 175 is indicated at 180, having the elongated opening 181. A photoelectric cell 185, in the chamber 175 is shown with the foot 186. A bolt 187 with a nut extends from the foot 186 and a washer 188 bears between the latter nut and the wall 180.

An amplifier is again indicated at 120 and a loud speaker at 121. Wires 122 and 123 connect the photoelectric cell 185 and the amplifier 120 and wires 124 and 125 again connect the amplifier 120 and the loud speaker 121. A sprocket wheel 129 is again positioned above the magazine 128.

A lantern is again indicated at 130, with the electric light bulb 131, and the sleeve 132 for its condenser lens.

Referring to Fig. 12 the light chamber of the apparatus is indicated at 200 with the front wall 201 having the opening 202 and the rear wall 203 having the opening 204. A cover 205, is detachably secured to the wall 203 over its opening 204. The top wall 206, of the chamber 200 is shown with the opening 207. A plate 208 with the microscopic slit 209 is fastened to the lower face of the wall 206. The film is again shown at 21 which has a light sound record thereon as already described. The film guide plates are again shown at 75 and 85, the plate 75 being fastened to the wall 201. The supporting plate is again shown at 95 with its supporting bars 96, guide pins 97, opening 99 and the springs 100. The Z shaped latch spring is again shown with its parallel ends 105 and 106. A right angled magnifying prism is indicated with the vertical face 211, the hypothenuse 212 and the lens convex shaped top face 213. The face 211 of the prism is fastened to the inner face of the wall 201 over the opening 202.

A second chamber is shown at 215, with its front wall 216 and the rear wall 217 having the elongated opening 218. The chamber 215 is provided with a top wall, not shown and side walls 220, one of which is shown. A photoelectric cell 221 is shown with the foot 222, which bears on the inner face of the wall 217 over the opening 218. A bolt 226 with a nut as shown extends from the foot 222 and a washer 227 bears between the latter nut and the wall 217.

Wires 122 and 123 extend from the photoelectric cell 221, to an amplifier 120 not shown, and the latter is connected to a loud speaker 121 not shown.

Referring to Fig. 13, the front wall 234, having the opening 235, of a light chamber is shown and a fragmentary portion of its bottom wall is shown at 236. The other walls of the latter light chamber are not shown. A plate 237 with the microscopic slit 238, is fastened to the wall 236. A right angled roof prism is indicated with the vertical face 240, the bottom face 241, and the hypothenuse 242. From the hypothenuse 242 extends a second right angled prism comprising the hypothenuse 245 and the side faces 246 and 247. The film 21 is indicated with its light sound record 22. The film 21 is guided in film guide plates not shown. The magnifying lense is indicated at 250 with its axial center co-axial with the opening 235. A photoelectric cell is indicated at 255, with the wires 122 and 123, which lead to an amplifier 120 not shown, and the latter is connected to a loud speaker 121 not shown. A source of light not shown is axially in line with the lens 250.

To operate the apparatus and referring to Figs. Nos. 1 to 8, constant light rays are projected from the electric light bulb 131 and pass through the condensing lens in the sleeve 132, and through the opening 99 of the supporting plate 95. The light rays then pass through the opening 93 of the plate 85 and through the light sound record 22 of the film 21, while the latter is moving downwardly in the direction of the arrow A. The light rays that pass through the opening 83 of the plate 75 and the opening 44 of the wall 43. The light rays next pass through the vertical face 57 of the prism 56, and the light sound record travels downwardly in the sequence of the arrow B as indicated. The light sound record next enters the prism 56 and strikes the hypothenuse 60 when said record is refracted at an angle of 90 degrees and leaves the prism 56, downwardly through its horizontal face 58 in the sequence of the arrow C. The light record then passes downwardly in the direction of the arrow D and passes through the magnifying lens 72 when it is magnified and inverted from right to left in the sequence as indicated by the arrow E. The light sound record then passes through the horizontal face 68 of the prism 66 in the sequence indicated by the said arrow E. The light sound record enters the prism 66 and strikes the hypothenuse 69 and is refracted at right angles and passes through the microscopic slit 65 in downward sequence in the direction of the arrow F, and then passes through the slit 65. The light sound record then impinges against the photoelectric cell 115, which is electrically energized. The current is amplified in the usual way by the amplifier 120, and sound is emitted from the loud speaker 121, in the same sequence as when opposite the opening 44.

Referring to Fig. 11 the film 21 again moves downwardly in the direction of the arrow A, and when it emerges from the magnifying lens 169, it has been inverted and passes upwardly in the sequence of the arrow G. The record next strikes the hypothenuse 160 of the prism 156 and is refracted at right angles and emerges from said prism in the sequence indicated by the arrow H. The light sound record then strikes the photoelectric cell 185, which is electrically energized and the amplifier 120 and loud speaker 121 operate as already described.

Referring to Fig. 12 the film 21 moves downwardly in the direction A as already described. The light sound record strikes the face 211 of the prism in the chamber 200 in the sequence designated by the arrow I, strikes the hypothenuse 212, is refracted at right angles and travels to the lens convexed shaped face 213 of the prism in the sequence indicated by the arrow J. The light sound record then passes through the face 213, when it is magnified and passes through the microscopic slit 209, after which it electrically energizes the photoelectric cell 221, and the amplifier and loud speaker are operated as already described.

Referring to Fig. 13 the film 21 moves downwardly in the direction of the arrow A as already described, and after it passes through the magnifying lens 250, the light sound record is inverted and moves upwardly in the sequence indicated by the arrow K. The light sound record then passes through the face 240 of the roof prism adjacent to the wall 234, at one side of its vertical center. The record then strikes the face 247 of the second prism and is refracted in the direction of the arrow L. The record is next refracted from the face 246 of the second prism, where it is reverted to its original sequence and moves downwardly in the direction of the arrow M and impinges against the photoelectric cell 255, whereby the amplifier and loud speaker are operated as already described.

It will be noted that the scavenging passage 94, Figs. 6 and 8, disposes of any foreign matter, such as dirt, fuzz, film emulsion and the like that may gather between the plates 75 and 85, and thereby is provided means for the light rays not to be obstructed when passing through the light sound record 22 of the film 21.

It will be noted that the photoelectric cell 115 can be clamped different distances from the microscopic slit 65, to locate said cell in a position to receive the light rays emitted from said slit on the most sensitive spot of the cell. The cell is clamped in different positions by its bolt 109. All the other photoelectric cells can also be clamped in different positions.

It is to be noted that the light sound record 22 of the film when moving between the film guide plates 75 and 85 is spaced from the guide strips of said plates.

Various modifications may be made in the invention and the present exemplification is to be taken as illustrative and not limitative thereof.

Having described our invention what we decide to secure by Letters Patent and claim is:

1. In an apparatus of the character described the combination of a constant source of light, a film having a light sound record, positioned for the light rays of said source of light to pass through said record, means to refract the light rays after passing through said record, means to next magnify the light rays and means to again refract said light rays, the combination of elements disposed to produce enlarged light rays moving in the same direction and sequence as the light rays emitted from the light sound record on the film.

2. In an apparatus of the character described the combination of a film, a light sound record on the film, means to move the film, a source of light positioned to project light rays through said light sound record while said film is moving, a prism with one of its faces positioned to receive said light rays after having passed through said light sound record, said light rays being refracted when passing through said prism, a second prism spaced from the first prism, in the line of the direction of the light rays, a magnifying lens between the prisms, the second prism again refracting the light rays, the combination of prisms and magnifying lens emitting an enlarged and magnified light sound record from the second prism moving in the same direction and sequence as the light passing through said light sound record on the film.

3. In an apparatus of the character described the combination of a projecting machine film, a light sound record on the film, means to move the film, a source of light positioned to project light rays through said light sound record while said film is moving, a right angled prism positioned with one of its side faces at right angles to the direction of the light rays as they pass through the record on the film, said prism refracting the light rays at an angle of ninety degrees, a second right angled prism spaced from said first prism, a magnifying lens between the two prisms, the light rays magnified by said lens, and again refracted ninety degrees when passing through the second prism, the combination of prisms and lens emitting a magnified light sound record from the second prism and moving in the same direction and sequence as the light rays when passing through the light sound record on the film.

4. In an apparatus of the character described the combination of a picture film, a light sound record on the film, means to move said film, means to project light rays through the light sound record of the film, a right angled prism having one of its side faces in a vertical plane at right angles to the said light rays, the other side face of the prism below and at right angles to its vertical face, a magnifying lens below said prism, a second right angled prism positioned below said lens, the latter prism having a vertical face and an upper horizontal face, a plate having a microscopic slit opposite the vertical face of the latter prism and a photoelectric cell opposite said microscopic slit, the combination of prisms and lenses emitting a magnified image of a light sound record from the second prism moving in the same direction and sequence as the light rays when passing through the light sound record on the film.

5. In an apparatus of the character described the combination of a source of light, a pair of film guide plates parallel to each other, spaced from the source of light, each of said plates having an opening coaxial with the light rays emitted from the source of light, a scavenging passage formed in the inner face of one of said plates and extending downwardly from the opening therein, a film adapted to move between said plates, said scavenging passage disposing of any foreign matter collected in the path of the record between said plates, means to refract the light rays after passing through said record, means to next magnify the light rays and means to again refract said light rays, the combination of elements emitting an image of a light sound record from the second prism, moving in the same direction and sequence as the light rays when passing through the light sound record.

6. In an apparatus of the character described the combination of a source of light, a pair of film guide plates spaced from the source of light, each of said plates having an opening coaxial with the light rays emitted from the source of light, a scavenging passage formed in the inner face of one of said plates and extending downwardly from the opening therein, a film having a light sound record thereon between said plates, means to move said film between said plates, said scavenging passage disposing of any foreign matter collected in the path of the light sound record between said plates during the movement of said film, means to refract the light rays after passing through said record, means to next magnify the light rays and means to again refract said light rays, the combination of elements disposed to produce enlarged light rays moving in the same direction and sequence as the light rays emitted from the light sound record on the film.

7. In an apparatus of the character described the combination of a picture film, a light sound record on the film, means to move said film, means to project light rays through the light sound record on the film, a right angled prism having one of its side faces in a plane at right angles to the direction of said light rays, the other side face of the prism below and at right angles to said first face, a magnifying lens spaced from said prism, a second right angled prism spaced from said lens, the latter prism having one of its side faces in the same plane with said side face of the first prism, a metallic coating on the said face of the second prism, said coating having a microscopic slit therein, the second prism having a face above and at right angles to its other face and parallel to the second face of the first prism, a photoelectric cell opposite said microscopic slit, an amplifier in connection with said cell and a loud speaker in connection with said amplifier, the combination of prisms and lenses emitting an image of a magnified light sound record from the second prism, moving in the same direction and sequence as the light rays when passing through the light sound record on the film.

8. In an apparatus of the character described the combination of a source of light, a condenser lens for the light rays of the source of light, film guide plates having openings therethrough, spaced from said lens, a moving film guided between said plates, a light sound record on said film, a magnifying lens positioned in line with the openings through the film guide plates, a wall having an opening in line with the axis of the magnifying lens, a right angled prism with one of its side faces fastened to said wall opposite the opening therein, a second face of the prism above the first face and at right angles thereto, a plate having a microscopic slit spaced from the second face of the prism and a photoelectric cell adjustably spaced from said slit.

9. In an apparatus of the character described the combination of a source of light, a condenser lens for the light rays of said source of light, film guide plates having openings therethrough and in line with each other, said plates spaced from said lens, a moving picture film guided between said plates, a light sound record on said film, a wall having an opening, the latter opening in line with openings in said plates, a right angled prism with one of its side faces fastened to said wall opposite the opening therein, a second face for the prism above its first face, said second face of the prism comprising a convex lens, the longitudinal axis of the lens parallel to the first face of the prism, a plate having a microscopic slit spaced from the convex lens of the prism and a photoelectric cell in line with and spaced from said slit.

10. In an apparatus of the character described the combination of a magnifying lens for a source of light, a wall having an opening, of a light chamber, positioned with its opening coaxial with said lens, a right angled prism having one of its side faces fastened to said wall opposite the opening therein, a bottom side face for the prism at right angles to its first face, a second right angle prism with its hypothenuse coincident with the hypothenuse of the first prism, the combination of said prisms constituting a roof prism, a plate having a microscopic slit, spaced from and opposite the bottom face of the first prism and a photoelectric cell spaced from and opposite said slit.

11. The method of producing sound from a light sound record of a film, consisting in moving said film, scavenging said film while it is moving, projecting light rays through the record of the film, refracting said light rays at an angle of ninety degrees, magnifying said light rays, again refracting said light rays at an angle of ninety degrees, separating a thin beam of light from said light rays, producing electric energy with said thin beam of light, the combination of steps producing light rays moving in the same direction and sequence as the light rays emitted from the light sound record on the film.

LYMAN A. WILSON.
JOSEPH JOHNSON.